United States Patent
Riche et al.

(10) Patent No.: US 9,448,086 B2
(45) Date of Patent: Sep. 20, 2016

(54) METHOD FOR ANALYZING THE ELECTRICITY CONSUMPTION OF A SITE PROVIDED WITH A PLURALITY OF ELECTRICAL DEVICES

(75) Inventors: Didier Riche, Suresnes (FR); Nadim El Rami, Chicago, IL (US); Dorian Tourin-Lebret, Sceaux (FR)

(73) Assignee: SMART IMPULSE, Chatenay-Malabry (FR)

( * ) Notice: Subject to any disclaimer, the term of this patent is extended or adjusted under 35 U.S.C. 154(b) by 136 days.

(21) Appl. No.: 14/124,372

(22) PCT Filed: Jun. 1, 2012

(86) PCT No.: PCT/FR2012/051230
§ 371 (c)(1),
(2), (4) Date: Apr. 25, 2014

(87) PCT Pub. No.: WO2012/168629
PCT Pub. Date: Dec. 13, 2012

(65) Prior Publication Data
US 2015/0137990 A1    May 21, 2015

(30) Foreign Application Priority Data
Jun. 8, 2011 (FR) ...................... 11 01745

(51) Int. Cl.
G08C 15/06 (2006.01)
G08C 19/20 (2006.01)
G01D 4/00 (2006.01)

(52) U.S. Cl.
CPC ............... *G01D 4/002* (2013.01); *G01D 4/00* (2013.01); *Y04S 20/38* (2013.01)

(58) Field of Classification Search
CPC .. H02J 13/0075; H02J 13/001; H02J 13/002; H02J 13/0062; H02J 13/0079; H02J 2003/143; Y04S 20/38; G01D 4/002; G01D 4/008; G01R 19/2513; G01R 22/063; G01R 22/10; H04Q 2209/43; H04Q 2209/60

USPC .................................................. 340/870.03
See application file for complete search history.

(56) References Cited

U.S. PATENT DOCUMENTS 8,359,215 B1 * 1/2013 Robbins et al. ............. 705/7.12
8,527,223 B2 * 9/2013 AbuAli et al. ................. 702/61
(Continued)

FOREIGN PATENT DOCUMENTS

EP    1296147 A1    3/2003
WO   9725625 A1    7/1997
(Continued)

OTHER PUBLICATIONS

Jian Liang et al.; Load Signature Study-Part I: Basic Concept, Structure, and Methodology, IEEE Trnasactions on Power Delivery, IEEE Service Center, New York, NY, US; vol. 25, No. 2, Apr. 1, 2010, pp. 551-560, XP011297458, ISSN:0885-8977.

*Primary Examiner* — Travis Hunnings
(74) *Attorney, Agent, or Firm* — Bachman & LaPointe, P.C.

(57) ABSTRACT

The present invention relates to a method for analyzing the electricity consumption of a site provided with a plurality of electrical devices of different types, wherein the method comprises: periodically measuring the current and the voltage over at least one of the electrical phases upstream from the power supply network of the site; and processing a combination of digitized signals in order to determine the distribution of the consumption on the basis of at least some of the devices in accordance with a signature of each of the devices. The processing involves comparing the waveform of the measured current with a library of pre-saved signatures for each of the electrical devices. The signatures comprising at least one parameter based on the waveform of the supply voltage. The signature of each device is predetermined during a prior step that involves: applying, to each device, a predetermined series of power supply sequences with voltage signals, the waveform of which represents the waveforms observed on ordinary electrical facilities; and recording the current waveform resulting from the operation of said device. The invention also relates to a method for modeling a device for implementing the analysis method.

6 Claims, 4 Drawing Sheets

(56) References Cited

U.S. PATENT DOCUMENTS

| | | | |
|---|---|---|---|
| 2003/0061252 A1* | 3/2003 | Murphy | 708/603 |
| 2004/0172207 A1* | 9/2004 | Hancock et al. | 702/60 |
| 2005/0083206 A1* | 4/2005 | Couch et al. | 340/657 |
| 2007/0150237 A1* | 6/2007 | Swarztrauber et al. | 702/188 |
| 2008/0140326 A1* | 6/2008 | Scholtz et al. | 702/60 |
| 2009/0037506 A1* | 2/2009 | Mochizuki | 708/404 |
| 2010/0070217 A1* | 3/2010 | Shimada et al. | 702/62 |
| 2010/0280774 A1* | 11/2010 | Ewing et al. | 702/60 |
| 2010/0280978 A1* | 11/2010 | Shimada et al. | 706/12 |
| 2010/0291977 A1* | 11/2010 | Vuong et al. | 455/574 |
| 2011/0046904 A1* | 2/2011 | Souilmi | 702/62 |
| 2011/0095608 A1 | 4/2011 | Jonsson et al. | |
| 2011/0098867 A1 | 4/2011 | Jonsson et al. | |
| 2011/0112780 A1* | 5/2011 | Moss | 702/62 |
| 2011/0282504 A1* | 11/2011 | Besore et al. | 700/291 |
| 2011/0320828 A1* | 12/2011 | Boss et al. | 713/300 |
| 2012/0109395 A1* | 5/2012 | Finch et al. | 700/295 |

FOREIGN PATENT DOCUMENTS

| | | |
|---|---|---|
| WO | 2010106253 A2 | 9/2010 |
| WO | 2011012840 A2 | 2/2011 |
| WO | 2011035301 A2 | 3/2011 |

* cited by examiner

METHOD FOR ANALYZING THE ELECTRICITY CONSUMPTION OF A SITE PROVIDED WITH A PLURALITY OF ELECTRICAL DEVICES

BACKGROUND

The present invention relates to the field of the non-intrusive analysis of the electricity consumption of a residential, commercial or industrial site i.e., not requiring the introduction of sensors associated with each one of the devices to be monitored nor the switching off of the power supply of the installation. This analysis more particularly makes it possible to identify the key leverages of power saving.

In the state of the art various solutions are known, which consist in acquiring information on the waveform factors of the current and/or voltage upstream from the site, and in deducing information on the individual consumption of each one of the electrical devices.

One family of solutions consists in observing the time variations of the load curve and in identifying signatures compared with reference signatures saved for the main devices.

In particular, the European patent application EP2000780 describes a method for detecting and estimating the consumption of electrical uses of a subscriber's facilities, characterized in that it consists at least in:
  establishing the curve of the general electricity consumption of the subscriber's facilities, with the step of establishing the curve of the general consumption of the subscriber's facilities including at least: sampling the consumption of the effluent consumed by the subscriber's devices, with said sampling being carried out downstream from the consumption effluent meter connected to the general network connection;
  identifying, through a segmentation of the curve of the general consumption of the subscriber's facilities and through a tracking of the transient-state power consumption events, the electrical uses and estimating the corresponding consumption thereof.

The international patent application WO 2010106253 also knows, which describes a method for analyzing the electricity consumption of a plurality of electrical devices operating on a consumption site, by filtering a load curve representing the electricity consumption of the devices vs time, characterized in that it comprises the following steps:
  prior to the actual filtering of the load curve:
  scanning and saving the load curve, in order to obtain a digitized load curve vs time periods;
  defining a set of class of devices, with each class being defined by similar power variation cycles;
  defining, for each class of devices, a load curve filtering algorithm dedicated to said device class, with said algorithm being adapted to retrieve power variation cycles of the digitized load curve, and allocate it to said class of devices;
  then during the filtering proper of the digitized curveload, successively using the filtering algorithms dedicated to each class of devices, to identify and gather, from the digitized curveload, variations in the cycles of the power consumed by the electrical devices.

A second family of solutions consists in taking into account not the time variation of the power measured upstream from the installation, but in taking into account the waveform of the current consumed by each one of the devices.

In particular, the international patent application WO2011012840 relates to a method for identifying the operation of an electrical device, for example an induction motor. The method comprises identifying the operation of an electrical device when a path traced by effective power values with respect to corresponding virtual power values during a particular period comprises one or more substantially circular arcs. The effective power values are associated with the total effective power supplied to one or more electrical devices over time, and the virtual power values are associated with the total virtual power supplied to one or more electrical devices over time. The invention also relates to an associated method for identifying the operation of a specified type of device, wherein the operation of said specified type of device depends on the supply of at least one source of energy, such as electricity, natural gas, or water. The invention also relates to computer programs, computer-readable media and corresponding computer program products and devices.

The European Patent 1296147 is also known, which describes a method for estimating the individual electricity consumption of a plurality electrical devices consisting in:
  creating a model to estimate the electrical power consumption of each one of the electrical devices from the relationship between the data on full load current fundamental and higher-order harmonics and the voltage phase differences thereof from the full load current and the voltage obtained from combinations of various operating conditions of a plurality of electrical devices and the electrical consumption used to obtain said data
  and get the electricity consumption of operating individual devices using said model to estimate the consumption of each device from said fundamental and higher-order harmonics of said full load current and said voltage phase differences thereof obtained from said full load current and voltage measured in the vicinity of a service entrance.

The processes consisting in observing the time variations of the load curve and identifying signatures compared with reference signatures saved for the main devices are not adapted to the analysis of sites with a large number of devices. As a matter of fact, the frequency of acquisitions is of the order of one second. When several devices stop or start with a small time lag, lower than the frequency of acquisition, a masking phenomenon occurs that prevents a relevant recognition of devices involved.

Besides, the method takes into account the transients only (on/off), and does not enable one to take into account the devices in continuous operation.

These problems have led to develop the second family of solutions based on the analysis of waveforms.

The technical problem with these methods is the reliability of the processing. As a matter of fact, these methods are based on the characterization of a device by a signature saved in a particular situation. When the device is used on a site, this signature is slightly disturbed, more particularly by the quality of the supply voltage. It is therefore necessary to provide a margin of error to enable the effective detection of the devices. The margin of error leads, however, to a risk of confusion between different devices, but each one being characterized by close signatures.

This problem prohibits the possibility of a universal database and requires a modeling for each site.

SUMMARY

The present invention aims to provide a technical solution to the problems raised by the methods of analysis of the state of the art.

To this end, the invention, in its broadest sense, relates to a method for analyzing the electricity consumption of a site provided with a plurality of electrical devices of different types, consisting in periodically measuring the current and the voltage over at least one of the electrical phases upstream from the power supply network of the site; and processing a combination of digitized signals in order to determine the distribution of the consumption on the basis of at least some of said devices in accordance with a signature of each of said devices, characterized in that said processing involves comparing the waveform of the measured current with a library of pre-recorded signatures for each of said electrical devices, said signatures comprising at least one parameter based on the waveform of the supply voltage, with the signature of each device being predetermined during a prior step that involves applying, to each device, a predetermined series of power supply sequences with voltage signals, the waveform of which represents the waveforms observed on ordinary electrical facilities and recording the current waveform resulting from the operation of said device.

Preferably, the signature of at least part of said devices is based on a combination of signatures of the electrical elements implemented by the considered devices.

Advantageously, a processing taking into account the activation cycle of the electrical elements composing each one of the considered devices is executed.

Preferably, at least a part of the signatures comprise at least one function parameter of the waveform of the observed supply voltage.

According to one particular implementation, a catalog of signatures is associated with at least a part of the devices, with each one of the signatures of the catalog of a device considered taking into account the voltage waveform of the power signal measured at the time of acquisition of the signature.

According to a preferred embodiment, the analysis processing consists in applying a first step of computing a Fast Fourier Transform on the current and voltage signals.

Advantageously, the analysis processing consists in applying a second step of decomposing the results of the Fast Fourier transform based on the characteristic signatures of each one of said devices.

According to an alternative embodiment, the analysis processing consists in applying an additional step of validating the results of the decomposition step which consists in checking the presence of time variations of the current waveforms of each one of the elements recognized.

Preferably, the analysis processing includes an additional step of associating the recognized elements to identify the devices concerned.

The invention also relates to a method for modeling the devices for implementing the analysis method, characterized in that the various electrical elements composing said electrical devices is supplied with a reference waveform voltage, and for saving digital data representing the waveform of the measured voltage and current signals.

Preferably, for each device, a catalog of signatures is saved, with each signature corresponding to the waveform of the measured voltage and current signals when supplied with a voltage having a different waveform.

BRIEF DESCRIPTION OF THE DRAWINGS

The present invention will be better understood upon reading the following description of a non-restricting embodiment, referring to the appended drawings wherein.

DETAILED DESCRIPTION

Figure 1:
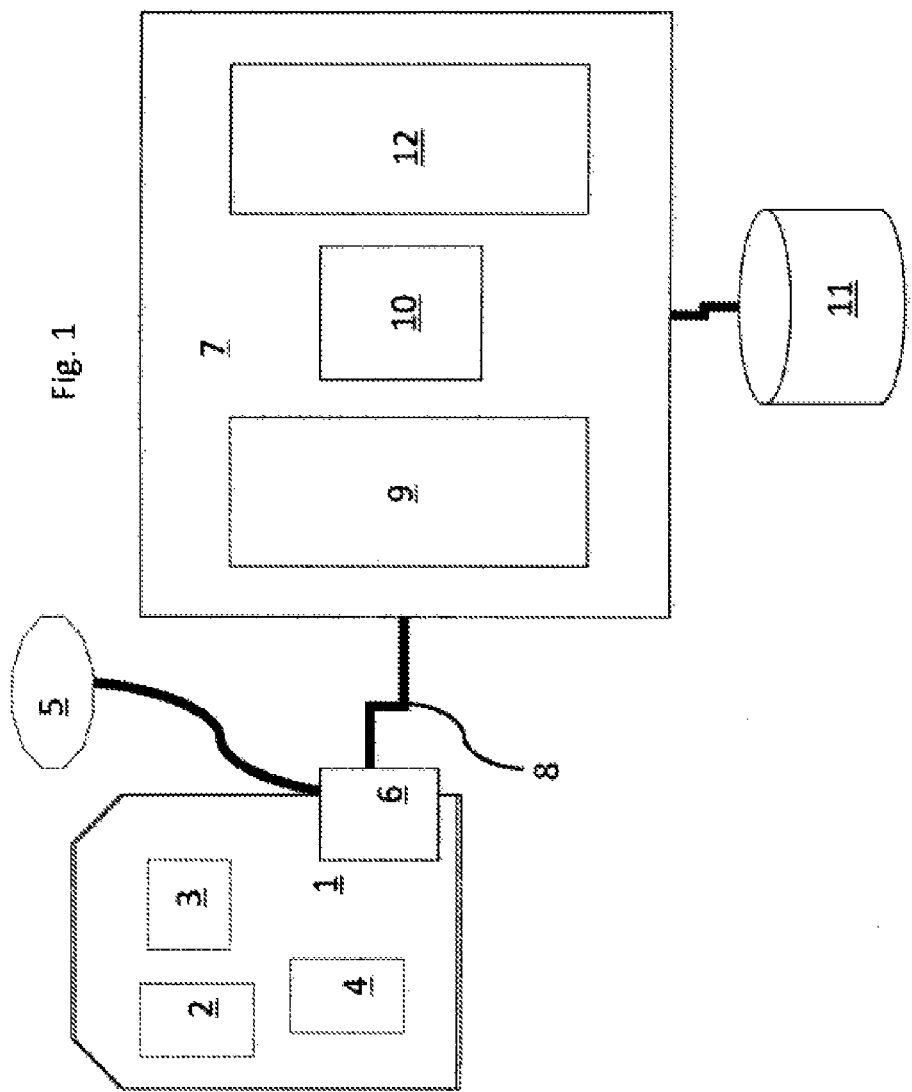
FIG. 1 shows a schematic view of an installation provided with an analysis means according to the invention

FIG. 1 shows an exemplary implementation of the invention.

The site 1 is formed for example by an individual or collective residential building, an office building or an industrial building, or a park comprising several buildings.

In this building are located various electrical devices 2 to 4, such as a computer, an illuminating light, one electric household appliance, heating or air conditioning equipment, etc. . . .

These various devices are connected to a private electricity network having a regular architecture, such private network being itself connected to the electric network of an energy distributor 5 via a junction station 6, for example a low voltage panel associated with a substructure.

Voltage and current sensors are installed in the junction station.

Rogowski coils providing a current-based signal with high accuracy are installed on each one of the supply phases.

For measuring voltages, a cable connected to the analysis tool 7 is connected to each phase. The analysis tool 7 is connected to the connecting station 6 via a cable bunch 8 for the transmission the waveforms of the measured currents and voltages.

Voltage Measurement

In a single-phase (a neutral conductor and a phase) or three-phase network (three phases and a neutral optionally), the voltage is the electrical quantity provided by the power distributor to each phase. Each device connected to a plug-in connector is supplied therewith.

In order to know the electrical environment of the observed network, the waveform of the voltage is measured on each phase. As a matter of fact, the behaviour of an electrical device varies depending on the voltage which is supplied thereto.

The information of interest is the voltage waveform during the signal period (20 ms at 50 Hz, for example), called the "observation period". The voltage waveform, similar to a sinusoidal wave exposed to interferences throughout the network connecting the central station to the consumption site, is fed to an electronic card and then acquired by an analog-to-digital converter. Thus, it is represented in digital form. The number of samples per period and the digitizing depth must be large enough to enable a faithful reproduction and a low measurement noise. Experience shows the need for at least 64 points per period and a digitizing depth of at least 10 bits.

Current Amount Measurement

Each device connected to an electrical network is supplied with a voltage, and thus consumes current. In a single-phase network, current flows through the neutral and the phase; in a balanced three-phase network, current flows through the three phases; in an unbalanced three-phase network, current flows through the three phases and the neutral.

As the components of an electrical device affect disturbances the interferences which the current passing therethrough is exposed to, it is desired to accurately measure the amount of such current.

To do this, current sensors (one per phase) are used, which are aimed at generating an image signal of the current flowing through an electrical conductor. Specifically, non-intrusive sensors called Rogowski coils are used, which are rings to be placed around the cables supplying an electrical installation. As these rings are open, it is not necessary to cut the power to position same.

The information of interest is the current amount waveform during the signal period (20 ms at 50 Hz, for example), called the "observation period". The waveform, similar to a sinusoidal wave exposed to interferences throughout the passage thereof through various electrical devices, is fed to an electronic card and then acquired by an analog-to-digital converter. Thus, it is represented in digital form. The number of samples per period and the digitizing depth must be large enough to enable a faithful reproduction and a low measurement noise. Experience shows the need for at least 64 points per period and a digitizing depth of at least 10 bits.

Analysis Tool Overview

The method for analyzing and distributing the electricity consumption requires an efficient measurement and acquisition chain of the voltage and current waveforms. The device 7 whereon the steps are based, comprises the following modules.

The current and voltage waveforms signals, measured at the connection point 6 and carried by the bunch of cables 8 are simultaneously digitized by high precision and low noise analog-to-digital converters 9.

The processing unit 10 performs digital operations on the measured data and compares same with references saved in a storage unit 11 according to the method described below.

The results thus obtained are made available to external devices or operators through a communication unit 12.

Modeling Protocol Overview

To ensure the reliability of the algorithms implemented, a plurality of electrical devices will be modelized prior to any analysis. The purpose of this phase is to build a catalog of signatures corresponding to all the devices to be identified when on the site.

Figure 2:
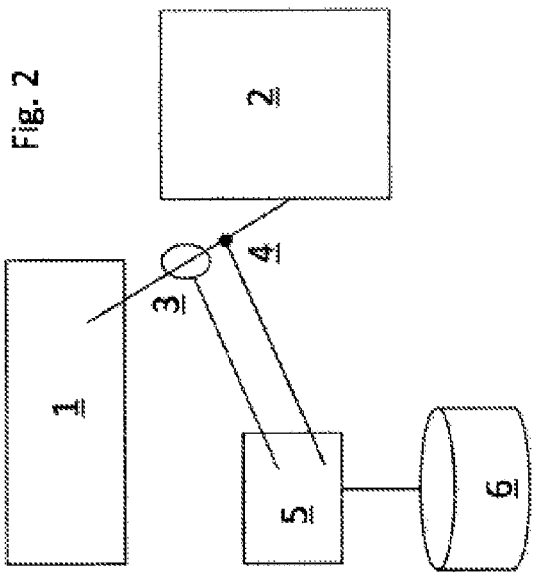
FIG. 2 shows the diagram of the steps implemented by the method.

FIG. 2 shows a schematic view of the modeling process. An electrical device 2 is modelized by a series of current waveforms captured while the device is powered by a series of waveforms of different voltages.

If possible, the electrical device to be modelized 2 is exposed to a series of voltage waveforms generated by a programmable voltage source 1 according to a statistical distribution of the voltage waveforms normally encountered in the target site or at all. For each one of these voltage waveforms, the waveforms of the supply voltage and the current consumed by the electrical device are measured using an acquisition unit 5 and current 3 and voltage 4 sensors. Waveform pairs are stored in the catalog 6.

If the device can not be supplied by a programmable voltage source—for reasons of space or too high power—measurements are made on the site for a long enough time to observe sufficiently different voltage waveforms.

By default, if only one current waveform associated with only one voltage waveform are available, the results are extrapolated to propagate the voltage variations to the current waveform.

Signal Processing Overview

Figure 3:
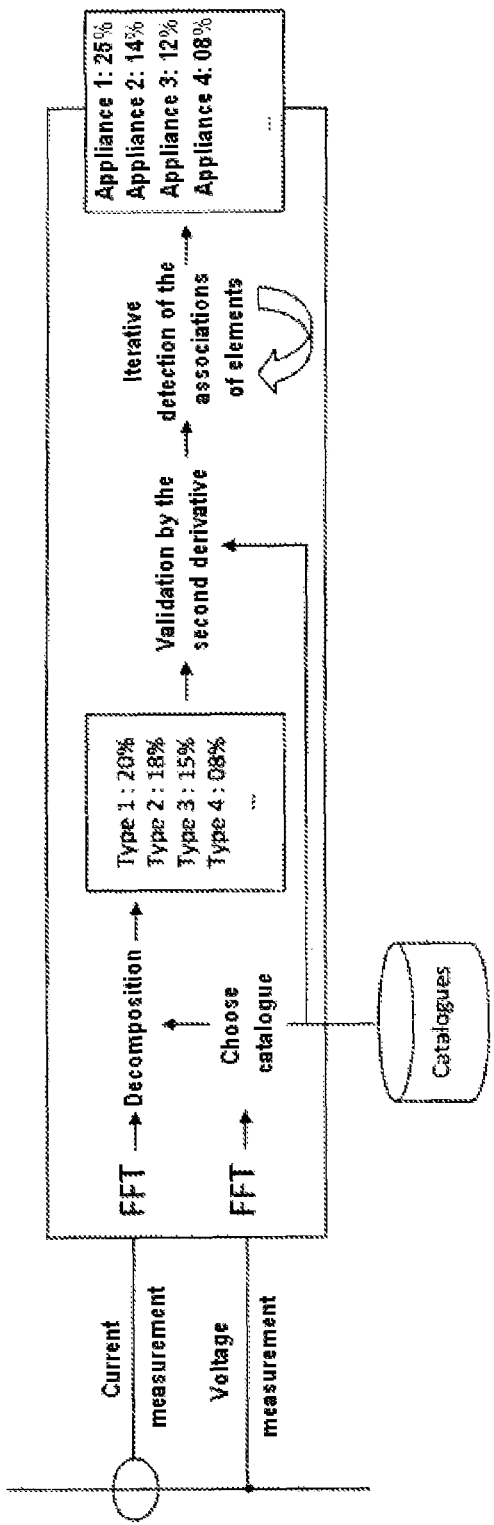
FIG. 3 shows a schematic view of the processing applied to the current and voltage signals measured at the supply network input of the site or a part of the site.

FIG. 3 shows a schematic view of the processing applied to the current and voltage signals measured at the supply network input of the site or a part of the site.

The electricity consumption distribution method is based on the analysis of the current and voltage waveforms. It can be broken down into six stages: selecting an observation window, retrieving the characteristics of the observed signals, selecting a set of suitable signatures, decomposing the signal observed based on the signatures, validating the results and time clustering of the results.

First, because of the number of transients and artifacts that can occur in a large electric network, a step of noise reduction must be implemented. All physical quantities, voltages and currents must be measured on a large number of periods, those with the least fluctuation must be isolated and the average thereof calculated. The procedure is as follows: simultaneously measuring the current and voltage waveforms; computing the variations in the successive waveforms, selecting the most similar periods, computing the average waveforms.

Then, the voltage and current signals are converted into the frequency domain by applying an algorithm of a Fast Fourier Transform (FFT). Experience shows that it is often sufficient to consider only the odd harmonics. At this stage, the second derivative function of the current waveforms is computed and a thresholding operation is executed to keep only the highest peaks. The FFT—second derivative couple is the set of characteristics observed in the electric network.

The electrical signature of a device depends on the waveform of the voltage supplied thereto, and the signatures of previously modelized individual devices that best match the current situation are selected. The first harmonics of the voltages are sufficient to determine the series of signatures to be considered for the continuation of the algorithm.

Then a problem of optimization is solved, the aim of which is to determine the coefficients of the equation binding the values of the first harmonics of the measured currents and the values of the first harmonics of the current of each one of the previously modelized electrical devices. The result is a vector of numbers between 0 and 1 representing the relative shares of the presence of each previously modelized electrical device.

As the method developed above is sensitive to phase variations—i.e. to small time shifts of the maximum and minimum amounts characterizing some devices—the results obtained by a method applied to the current waveforms in the time space are checked. The aim is to check the presence of maximum and minimum current characterizing some electrical devices by comparing the positions—or shift—and the relative amplitude thereof. The peaks of the second derivative of the current signals are used therefor. For example, if the optimization determines that there is 30% of computers, and that one computer is characterized by a peak in the normalized amplitude second derivative of 32 and in 45° and 225° positions (first quarter of each half-cycle), then the presence of peaks within the amount waveform having an amplitude of approximately 30%*32=10 and in 45° and 225° positions.

The results obtained by the instantaneous analysis of current waveforms represent the consumption of modelized electrical elements but do not make it possible to identify electrical devices having a complex or cyclic operation. To achieve this goal, the time evolution of the results of the optimization, from several seconds to several hours, is also studied to detect recurrent time patterns that can be grouped. To do this, two successive results of the previous algorithm are compared. The variations are observed and the weight of each combination is incremented—for example engine 20% and heating resistance 80%. Beyond a certain threshold, the combinations will be considered as devices in full.

Figure 4:
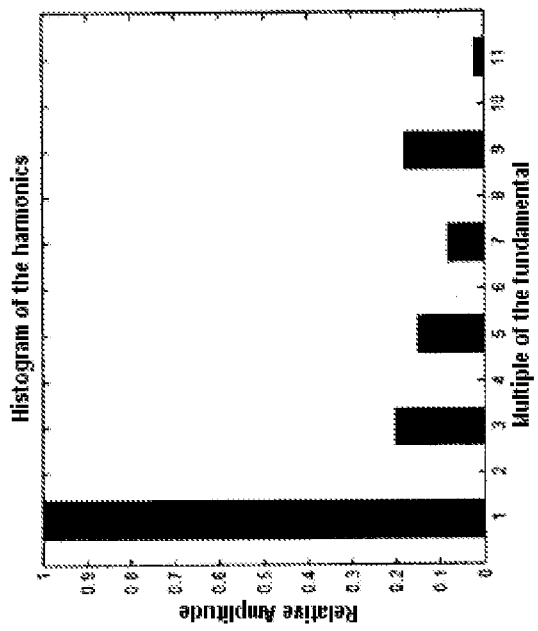
FIG. 4 shows the waveforms of an exemplary current signal.
Figure 5:
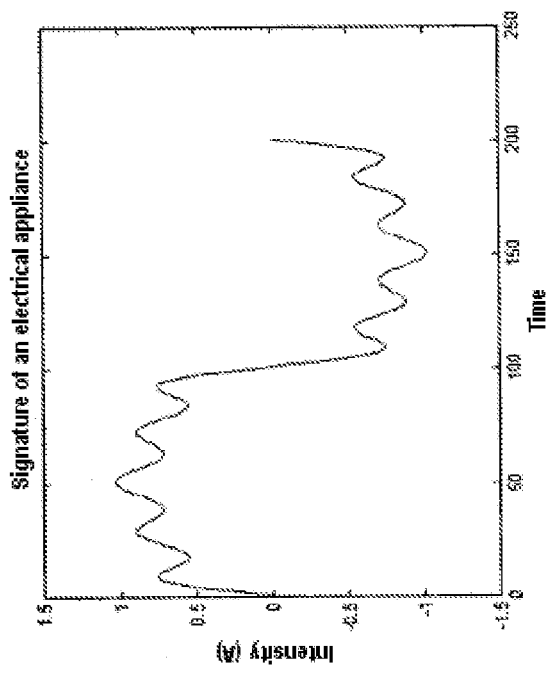
FIG. 5 shows a histogram of the harmonics resulting from the application of a Fast Fourier Transform to the current signal shown in FIG. 4.

FIGS. 4 and 5 show the waveforms, representative of an electrical device, respectively, the time variation of the amount measured when an electrical device is operating, and the histogram of the harmonics resulting from the application of a Fast Fourier Transform to the current signal shown in FIG. 4.

The signature consists for example of the following parameters:
- the real part of the successive harmonics of the current signals
- the imaginary part of the successive harmonics of the current signals
- the peaks of the second derivative of the current signals.

These parameters make it possible to take into account the current characteristics as regards frequency and time.

These parameters are both stable and reproducible, and differentiate the devices electrical components.

The invention claimed is:

1. A method for analyzing the electricity consumption of a site provided with a plurality of electrical devices of different types, comprising:
periodically measuring a current and a voltage over at least one of the electrical phases upstream from a power supply network of the site; and processing a combination of digitized signals in order to determine the distribution of the consumption on the basis of at least some of said devices in accordance with a signature of each of said devices, wherein said processing involves comparing a waveform of the measured current with a library of presaved signatures for each of said electrical devices, said signatures comprising at least one parameter based on a waveform of the supply voltage, with the signature of each device being predetermined during a prior step that involves applying, to each device, a predetermined series of power supply sequences with voltage signals, the waveform of which represents the waveforms observed on electrical facilities and recording the current waveform resulting from the operation of said device; wherein the analysis processing comprises applying a first step of computing a Fast Fourier Transform on a current signal and a voltage signal; applying a second step of decomposing the results of the Fast Fourier transform based on the characteristic signatures of each one of said devices; and applying an additional step of validating the results of the decomposition step comprising checking the presence of time variations of the current waveforms of each one of the elements recognized.

2. The method for analyzing the electricity consumption of a site provided in accordance with claim 1, wherein the signature of at least part of said devices is based on a combination of signatures of the electrical elements implemented by the considered devices.

3. The method for analyzing the electricity consumption of a site according to claim 2, further comprising: processing taking into account the activation cycle of the electrical elements composing each one of the devices is executed.

4. The method for analyzing the electricity consumption of a site according to claim 1, wherein the analysis processing includes an additional step of associating the recognized elements to identify the devices concerned.

5. The method of claim 1, further comprising supplying a various electrical elements composing said electrical devices with a reference waveform voltage, and for saving digital data representing the waveform of the measured voltage and current signals.

6. The method of claim 5, further comprising: saving a catalog of signatures for each device, wherein said signatures correspond to the waveform of the measured voltage and current signals measured when said device was supplied with a voltage having a different waveform.

* * * * *